(12) United States Patent
Suzuki et al.

(10) Patent No.: US 6,490,115 B1
(45) Date of Patent: Dec. 3, 2002

(54) ERROR RECOVERY IN UNIT USING GMR SENSOR

(75) Inventors: Hiroaki Suzuki, Machida (JP); Koji Kurachi, Yokohama (JP); Katsumi Suda, Yamato (JP); Hideo Asano, Machida (JP); Kenji Okada, Yokohama (JP); Makoto Takase, Yamato (JP); Akira Kibashi, Zama (JP); Hiromi Nishimiya, Sagamihara (JP); Takao Matsui, Yamato (JP); Tatsuya Endo, Fujisawa (JP); Kenji Kuroki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/218,724

(22) Filed: Dec. 22, 1998

(30) Foreign Application Priority Data

Dec. 25, 1997 (JP) ............................................... 9-356896

(51) Int. Cl.⁷ ............................................... G11B 21/02
(52) U.S. Cl. ........................... 360/75; 360/66; 360/313; 360/324
(58) Field of Search ........................... 360/75, 66, 313, 360/324, 324.1

(56) References Cited

U.S. PATENT DOCUMENTS

| 5,650,887 | A |   | 7/1997  | Dovek et al. ................ 360/75  |
| 5,748,399 | A | * | 5/1998  | Gill ............................. 360/66  |
| 5,903,415 | A | * | 5/1999  | Gill ......................... 360/75 X  |
| 5,969,523 | A | * | 10/1999 | Chung et al. ............. 360/66 X  |
| 6,118,622 | A | * | 9/2000  | Gill ............................ 360/113 |

FOREIGN PATENT DOCUMENTS

| JP | 06473269 A | 3/1989 |
| JP | 04067367 A | 3/1990 |
| JP | 04219677 A | 8/1992 |
| JP | 05174338 A | 7/1993 |
| JP | 06052635 A | 2/1994 |
| JP | 06223308 A | 8/1994 |
| JP | 08055438 A | 2/1996 |
| JP | 09081909 A | 3/1997 |
| JP | 09251728 A | 9/1997 |
| JP | 10049837 A | 2/1998 |

OTHER PUBLICATIONS

C. Tsang et al., "Design, Fabrication & Testing of Spin-Valve Read Heads for High Density Recording", IEEE Trans. on Magnetics, vol. 30, No. 6, Nov. 1994, pp. 3801–3806.

R. W. Wood et al., "Viterbi Detection of Class IV Partial Response on a Magnetic Recording Channel", IEEE Trans. on Comm., vol. COM–34, No. 5, May 1986, pp. 454–461.

K. J. Knudson et al., "Dynamic Threshold Implementation of the Maximum–Likelihood Detector for the EPR4 Channel", GLOBECOM '91, pp. 2135–2139.

* cited by examiner

Primary Examiner—Regina N. Holder
Assistant Examiner—Mitchell Slavitt
(74) Attorney, Agent, or Firm—G. Marlin Knight; Ron Feece

(57) ABSTRACT

A method and apparatus for recovering from operation errors arising in an information recording and reproducing unit using a head with a GMR sensor is described. The read and write operations of the unit comprise executing a first error recovery procedure for recovering the operation error, executing a first GMR evaluation procedure for evaluating the performance of the GMR sensor when the operation error cannot be recovered by the first error recovery procedure, and applying a resetting pulse to the GMR sensor in accordance with the first GMR evaluation procedure.

15 Claims, 7 Drawing Sheets

| Number | Decision item | Type of ERP | | |
|---|---|---|---|---|
| | | Read | Write | Seek |
| 1 | Contact between head and storage medium (TA) | 0 | | |
| 2 | Anti-regular write (WRITE LONG) | 0 | | |
| 3 | Regenerative signal margin check | 0 | | |
| 4 | Adjacent sector read | 0 | | |
| 5 | Presence of execution-inhibited ERP execution step | 0 | 0 | |
| 6 | Adjacent track seek | | 0 | 0 |
| 7 | Servo check | | 0 | |
| 8 | Regenerative signal waveform error check (MSE) | 0 | 0 | 0 |
| 9 | Coincidence of reassignment cause head with reassignment destination head | | 0 | |

*FIG. 6*

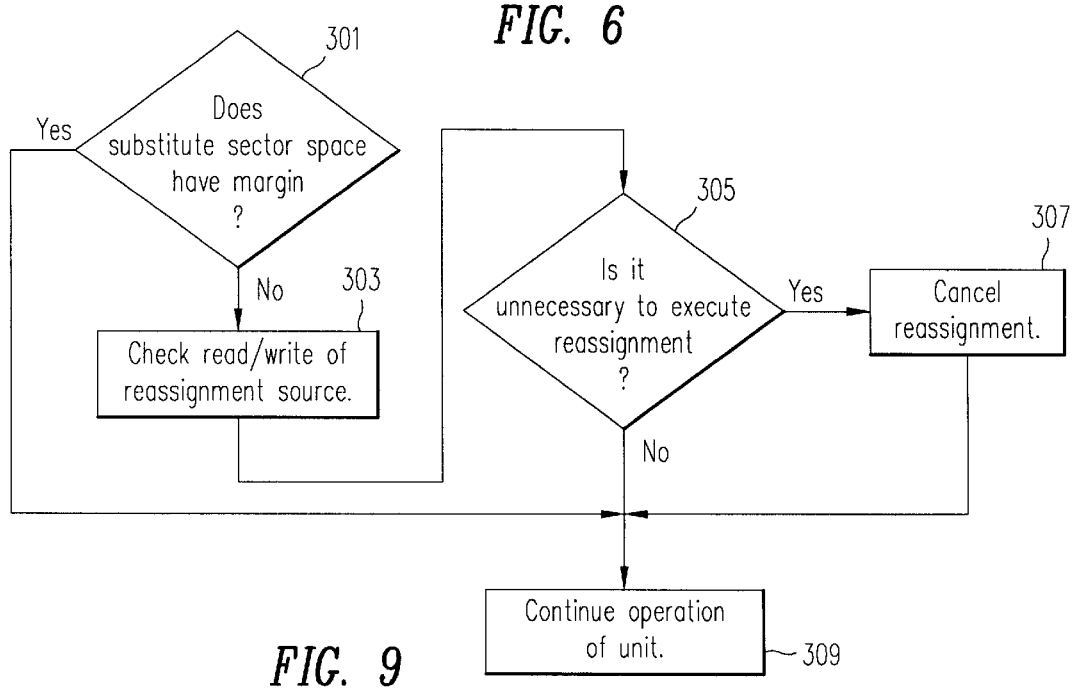

*FIG. 9*

ERROR RECOVERY IN UNIT USING GMR SENSOR

BACKGROUND OF THE INVENTION

1. Field of the Invention

The present invention relates to an information recording and reproducing unit using a giant magnetoresistance sensor (hereafter referred to as GMR sensor), particularly to recovering from errors in the performance of the GMR sensor in the information recording and reproducing unit.

2. Description of Related Art

An MR sensor using the anisotropic magnetoresistance effect has been used as the reproducing head of a magnetic disk drive. However, a GMR sensor has been recently used which is superior in reproducing capacity. The GMR sensor shows a high magnetoresistance change to a low magnetic field stored in a medium by using the giant magnetoresistance effect and realizes a high recording density. A GMR sensor is described in IEEE TRANSACTIONS ON MAGNETICS, Vol. 30, No. 6 November 1994, "Design, Fabrication & Testing of Spin-Valve Read Heads for High Density Recording".

In general, a GMR sensor is constituted by arranging two ferromagnetic layers at the sides of a non-ferromagnetic layer. One ferromagnetic layer is referred to as a free layer and the magnetizing direction of the layer is oriented in a certain direction when there is no external magnetic field. However, when an external magnetic field is applied to the layer, the layer can freely rotate in the direction of the applied magnetic-field. The other ferromagnetic layer is referred to as a pinning layer and the magnetizing direction of the layer is fixed to a direction perpendicular to the magnetizing direction of the free layer in the state of no external applied magnetic field, and it is not changed due to an external magnetic field. To fix the magnetizing direction of the pinning layer, an anti-ferromagnetic layer referred to as a fixed layer is attached so as to directly contact the pinning layer. The fixed layer provides a fixed magnetic field in order to pin the magnetizing direction of the pinning layer through switched connection.

When making a sensor approach the surface of a disk, magnetizing directions of a free layer are changed in accordance with the direction of the magnetic flux on the disk surface and electric resistances of the sensor are also changed. Therefore, by supplying a bias current to the sensor, it is possible to read the data stored in the disk as the change of magnetizing directions.

To magnetize an anti-ferromagnetic layer (fixed layer) in a predetermined direction, the anti-ferromagnetic layer is heated up to the blocking temperature or higher and cooled in a magnetic field suitable for pinning. The blocking temperature is a temperature at which the exchange anisotropy of the anti-ferromagnetic layer disappears.

When the temperature of a GMR sensor used for a magnetic disk drive undergoes a temperature stress for a long time due to temperature rise in the disk drive, physical contact between the GMR sensor and a magnetic disk serving as a storage medium, and heating by a bias current, a pinning layer cannot be pinned in the initial direction due to surrounding magnetic fields and the amplification factor lowers or a regenerative waveform is deformed and thereby, a predetermined performance cannot be displayed. Thus, an operation error occurs relating to a read error or user data or servo data.

U.S. Pat. No. 5,650,887 commonly assigned with the present application discloses a system for detecting the magnetizing direction of the fixed layer of a GMR sensor used for a magnetic disk drive when the direction deviates from the predetermined direction and recovering the direction by applying a predetermined current pulse. In the case of this patent invention, it is decided whether a read error arising in user data is caused by a read error of servo data and the amplification factor of an automatic gain control circuit is a predetermined value or more and thereafter, a reset pulse is sent to the GMR sensor. Moreover, after applying the reset pulse, the normal error recovery operation is started. Part of the reset pulse heats the GMR sensor up to the blocking temperature or higher and another part for lowering the temperature of the GMR sensor up to the blocking temperature or lower and applying a magnetic field in a predetermined direction.

The performance of a GMR sensor set to the actuator arm of a magnetic disk drive can be known through an operation error indication of the disk drive under working conditions. However, an operation errors can occur due to causes other than deterioration of the performance of the GMR sensor, e.g. swinging of the spindle or vibration of the disk drive. An error due to deterioration of the performance of the GMR sensor is distinguished in the disk drive from an error due to other causes and processed by an error recovery program (ERP). If a current or voltage reset pulse is applied to a GMR sensor whose performance is not deteriorated to perform GMR resetting, the performance of the GMR sensor may be deteriorated. Moreover, unless the performance is recovered by one-time application of a reset pulse, it is possible to recover the performance by gradually increasing the amplitude of the reset pulse and repeating GMR resetting several times. However, even if further applying a reset pulse to a GMR sensor whose performance is deteriorated due to application of a reset pulse, the performance cannot be recovered in most cases. When increasing the amplitude of a reset pulse and continuously applying the reset pulse to a GMR sensor whose performance is not deteriorated, the GMR sensor is damaged.

When the performance of a GMR sensor is deteriorated, an ERP recovers an error by reassigning a sector from which data can barely be read or in which data cannot be written to a substitute spare sector. However, the number of substitute sectors is limited. Therefore, if every substitute sector is used, subsequent errors cannot be recovered by reassignment. Moreover, it is preferable to not use a substitute sector because use of the substitute sector lowers the access speed of a head to a magnetic disk.

Furthermore, because a storage medium of a magnetic disk drive generates a magnetic field on its surface, the GMR resetting effect cannot be completely obtained if a GMR sensor is strongly influenced by the magnetic field immediately after a reset pulse is applied to the sensor.

SUMMARY OF THE INVENTION

Therefore, it is an object of the present invention to improve the performance and reliability of an information recording and reproducing unit such as a magnetic disk drive using a GMR sensor.

Specifically, it is an object of the present invention to decide whether an error unrecoverable by conventional ERP arising in an information recording and reproducing unit is caused by a GMR sensor before performing GMR resetting, improve the effectiveness of GMR resetting without accelerating the deterioration of the sensor by careless GMR resetting, and quickly recover the error.

It is another object of the present invention to decide whether the last resetting deteriorated the performance of a sensor relative to the first resetting and the performance of the head after resetting performed before the scheduled resetting in order to perform GMR resetting at the second time downward and thereby, determine whether to perform the scheduled resetting, improve the certainty, and prevent a GMR sensor from being damaged.

It is still another object of the present invention to count the number of reassignments of a sector due to a read or write error even when an error can be recovered by an ERP, prevent the access time of a head due to reassignment from increasing by resetting the head in accordance with the number of reassignments for each head, and prevent every substitute sector for reassignment from being used.

It is still another object of the present invention to provide to quickly and securely perform GMR resetting by excluding the influence of a magnetic field generated by a storage medium in a disk drive.

It is still another object of the present invention to provide a magnetic disk drive in which the above error recovery method is applied.

The present invention to recovers an operation error arising in an information recording and reproducing unit provided with a head using a GMR sensor by confirming whether the error is caused by the GMR sensor deterioration and thereafter applies a reset pulse to the GMR sensor.

According to a mode of the present invention, a first error recovery procedure is executed after an operation error occurs. The first error recovery procedure does not include application of a reset pulse. Therefore, when the operation error is caused by deterioration of the performance of a GMR sensor, the error may not be recovered by the first error recovery procedure. In this case, GMR resetting is not immediately performed but a first GMR evaluation procedure is executed to confirm whether the error is caused by the GMR sensor. According to the above structure, even if the error cannot be recovered due to a cause other than the GMR sensor, it is possible to prevent the performance of the sensor from deteriorating by performing GMR resetting and quickly execute other possible recovery means.

According to another mode of the present invention, when a reset pulse is applied and thereafter a second error recovery procedure is executed but an error still cannot be recovered, a second GMR evaluation procedure is executed and thereafter, a reset pulse is applied. According to the above structure, even if the performance of a GMR sensor cannot be recovered through the last GMR resetting, the performance of the GMR sensor can be recovered by repeating GMR resetting second time. Moreover, when it is decided in accordance with a second GMR evaluation procedure that the performance of the sensor is deteriorated due to GMR resetting, it is possible to decide that application of a reset pulse is not effective for recovery of the performance of the sensor and prevent the sensor from damaging due to careless repetition of GMR resetting.

According to still another mode of the present invention, various modes are provided as evaluation items of the first GMR evaluation procedure. Though at least one evaluation item is necessary, it is possible to improve the accuracy by combining a plurality of items. Moreover, the second GMR evaluation procedure makes it possible to improve the accuracy of performance evaluation by using the bit pattern of user data or the standard test bit pattern recorded in an exclusive calibration sector and thereby, selecting an item capable of directly measuring whether the performance of a sensor after performing GMR resetting is changed.

According to still another mode of the present invention, the number of reassignments performed under execution of an error recovery procedure is counted and GMR resetting is performed in accordance with the number of reassignments. Therefore, it is possible to prevent a state in which the access time of a unit is increased because deterioration of a GMR sensor is accelerated and the number of reassignments increased and prevent all of the substitute sectors from being used. Moreover, to confirm that the number of reassignments is increased due to a GMR sensor, it is possible to evaluate the error of the waveform of a regenerative signal and improve the effectiveness of GMR resetting. Furthermore, by checking if data can be read from or written in a reassignment source sector after performing GMR resetting, it is confirmed whether executed reassignment can be recovered. When the reassignment is caused by a GMR sensor and the performance of a head is recovered by GMR resetting, it is possible to cancel the reassignment, enlarge the number of substitute sectors, and moreover, decrease the access time for the head. Furthermore, it is also possible to use the dummy write frequency for the decision on resetting as an index showing deterioration of a GMR sensor instead of the number of reassignments.

According to still another mode of the present invention, a head is positioned to a position not influenced by the magnetic flux generated by a storage medium when applying a reset pulse to effectively execute GMR resetting. To obtain a position not influenced by magnetic flux, it is possible to position a head to an exclusive DC-erased area provided for the recording area on a magnetic disk or outermost or innermost cylinder in which no data or servo data is stored. When performing GMR resetting by stopping a unit, it is possible to position a head to a non-recording area in the case of a contact start/stop (CSS) unit or position a head to a ramp in the case of a load/unload type unit.

BRIEF DESCRIPTION OF THE DRAWINGS

FIG. 6 shows decision items for deciding the first resetting of this embodiment;

FIG. 9 is a flow chart for explaining an embodiment of the present invention.

DETAILED DESCRIPTION OF THE PREFERRED EMBODIMENT

Figure 1:
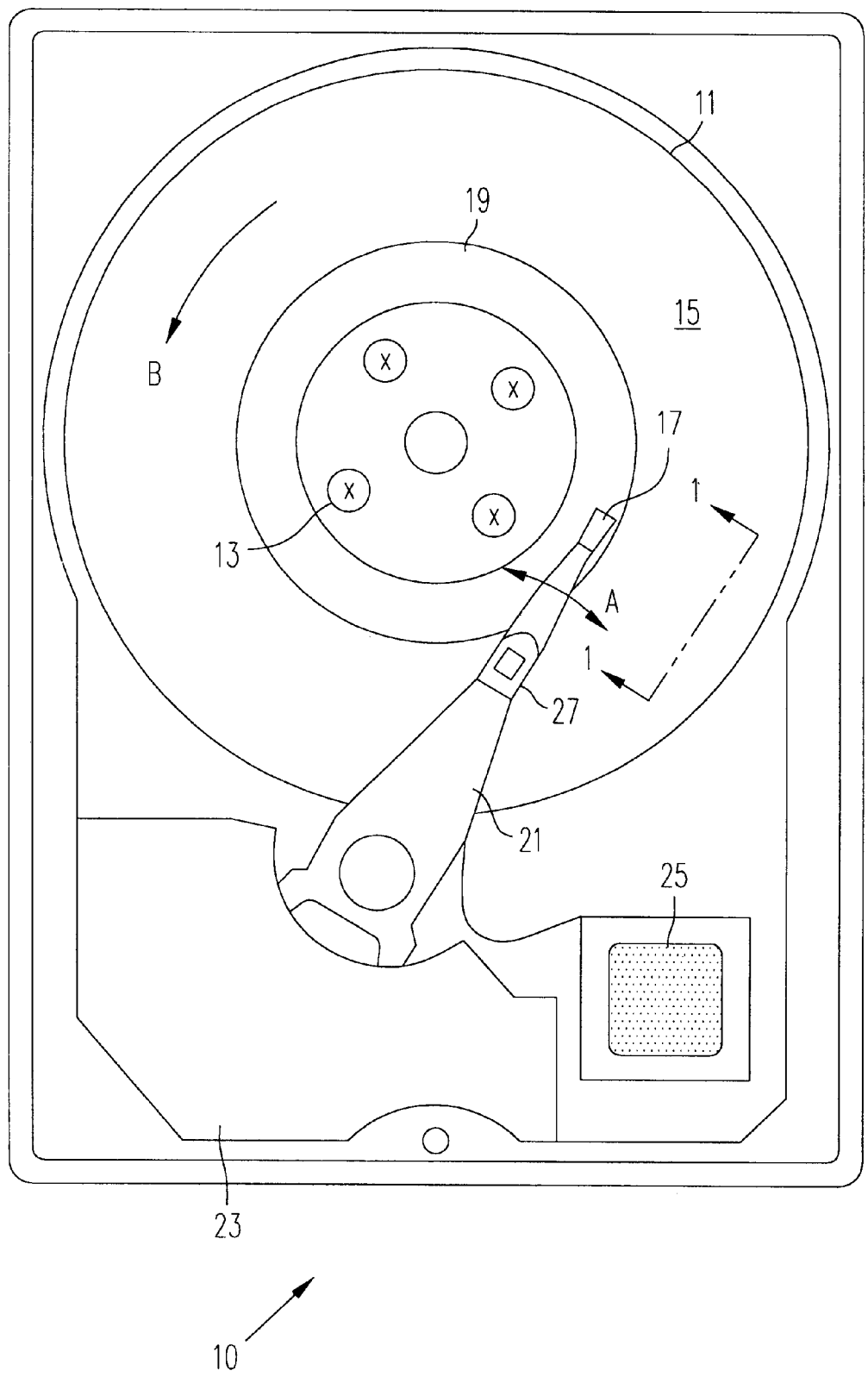
FIG. 1 is a schematic top view of a magnetic disk drive for explaining an embodiment of the present invention.
Figure 2:
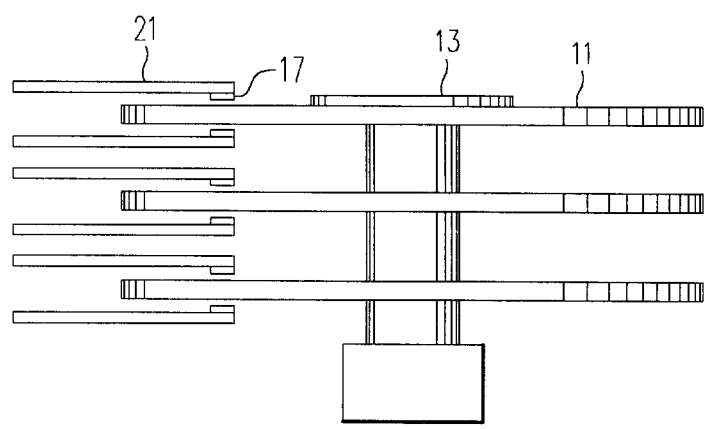
FIG. 2 is a schematic side view of the magnetic disk and actuator arm portion of the magnetic disk drive in FIG. 1.
Figure 3:
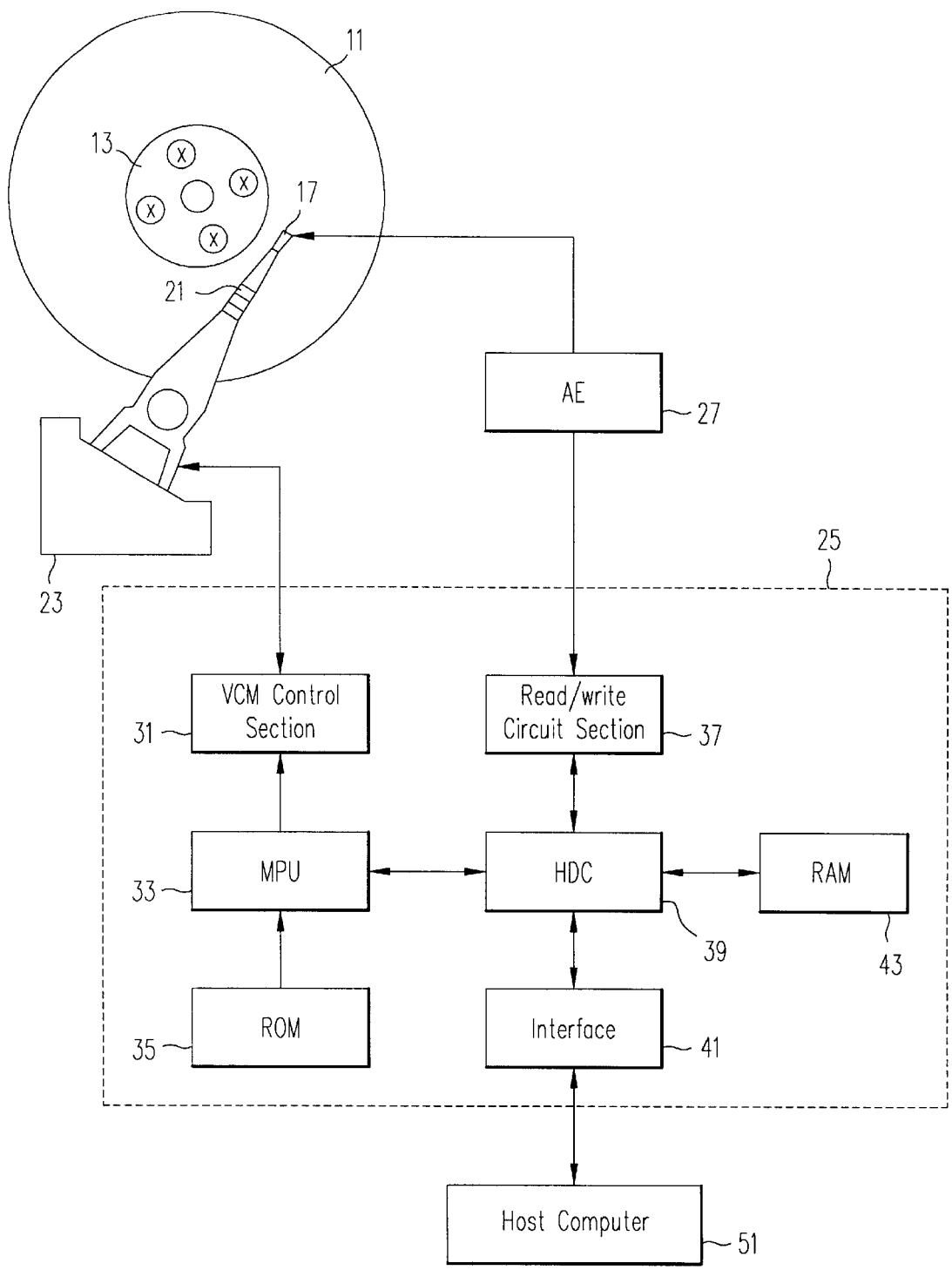
FIG. 3 is a schematic block diagram of the magnetic disk drive in FIG. 1.

A magnetic disk drive to which an embodiment of the present invention is applied is described below by referring to FIGS. 1 to 3. FIG. 1 is a schematic top view of a magnetic disk drive, FIG. 2 is a schematic side view showing the magnetic disk and actuator arm in FIG. 1, and FIG. 3 is a schematic block diagram. Three magnetic disks 11 are superimposed at intervals each other and set to a spindle shaft 13. When data is written or read, the disks 11 are rotated together with the spindle shaft 13 in the direction of the arrow B by a spindle motor (not illustrated). Each magnetic disk 11 includes a recording area 15 used to record information and a non-recording area 19 for positioning a magnetic head 17 when stopping the rotation of the magnetic disk 11. The recording area 15 is divided into a plurality of annular tracks and each track is divided into a plurality of data sectors comprising a synchronizing signal, 512-byte user data, and an ECC (Error Correction Code). Moreover, servo data is recorded in the discrete area of the recording area 15 as a plurality of blocks. Three magnetic disks 11 respectively use their surface and back as recording areas and form a cylinder with six tracks of six recording planes included in a cylinder including a track.

In case of CSS type disk drive, texture is formed on the surface of the non-recording area 19 to decrease the frictional force between a slider (not illustrated) of the magnetic head 17 and the non-recording area 19 of a magnetic disk in starting to rotate the magnetic dish 11 in the CSS system. An actuator arm 21 is driven by a VCM (voice coil motor) 23 to rotate on the surface of each magnetic disk 11 in the direction of the arrow A. The actuator arms 21 are superimposed at intervals so as to correspond to three magnetic disks and the front end of each actuator arm 21 is provided with six magnetic heads 17 through a support member having elasticity on the upper side and lower side of each magnetic disk. Each magnetic head 17 comprises a slider, a GMR sensor for reading (not illustrated) included in the slider, and a induction coil for writing purposes. The GMR sensor reads servo data when reading, writing, or seeking data and also reads user data. An AE (Arm electronics) module 27 is set to the actuator arm 21 to supply the bias current to the GMR sensor, amplify a regenerative signal generated by the head 17 by reading the data stored in the magnetic disk 11, supplies a write current to a write coil, and generates and supplies a pulse voltage for resetting a GMR sensor.

When data is written or read, the actuator arm 21 rotates on the surface of the rotating magnetic disk 11 in the direction of the arrow A and a GMR sensor performs the seek operation for scanning the position of any track on the surface of the recording area 15. In this case, the slider is given a levitation force by the air flow generated on the surface of the magnetic disk 11 and the magnetic head 17 flies a certain distance from the surface of the magnetic disk 11. A control section 25 includes an electronic circuit for controlling the operation of the actuator arm 21 and executing data read or write.

Moreover, in FIG. 3, the control section 25 controls the seek operation of the actuator arm 21 through a VCM control section 31 and moreover, controls the read/write operation of the magnetic head 17 through a read/write circuit section 37. The read/write circuit section 37 is connected to a hard disk controller (HDC) 39. The read/write circuit section 37 serves as a read/write channel for converting a digital signal of user data and a current/voltage signal supplied to or generated by a magnetic head in two ways. This embodiment uses a partial response channel.

The HDC 39 connects with a memory (RAM) 43 and a host computer 51 through an interface 41. The HDC 39 controls the RAM 43, transfers data between the RAM 43 and the disk 11, generates an ID table, generates a position error signal (PES) in accordance with servo data, and transmits the positional information of a head to a microprocessing unit (MPU) 33. The RAM 43 stores a microcode for unit control and ID table read from the disk 11 at start of a unit. The HDC 39 is connected to the MPU 33 and the MPU 33 connects with a memory (ROM) 35 and the VCM control section 31. The MPU 33 decodes a command sent from the host computer 51 to make the HDC 39 generate an ID table, orders an address specified by a command to read or write data, and transmits the control information for making a magnetic head seek a predetermined track to the VCM control section 31 in accordance with the positional information of a head generated by the HDC.

The VCM control section 31 drives a VCM 23 so as to position the magnetic head 17 to a predetermined track in accordance with the control information supplied from the MPU 33. The ROM 35 stores a microcode necessary for starting a unit. A program for executing this embodiment is read to the RAM 43 from the magnetic disk 11 as a part of an ERP when the unit is started. When there occurs an error in the unit, the MPU controls each section so as to execute a write ERP, read ERP, and seek ERP in accordance with a predetermined procedure correspondingly to the operation mode of the unit at that point of time.

Then, the procedure for deciding whether to apply a reset voltage to a GMR sensor in an ERP when any operation error occurs in the unit is described below in accordance with the flow chart in FIG. 4. The specific hardware shown to realize subsequent procedure is used only to explain this embodiment and realizing the same procedure with other hardware is included in the range of the technical idea of the present invention.

When user data is written in each sector of a magnetic disk, an ECC for data error detection and correction generated in accordance with the bit pattern of the data is calculated by the HDC 39 and automatically written in the magnetic disk together with the user data. An error occurs in the bits of read user data when data is read and the HDC uses the ECC but correct data cannot be reproduced. Moreover, when data is read by accessing an address different from a specified address, a read error also occurs. When data is written, it is necessary to perform servo control for positioning the write coil of a head to the write center position of each track and a specified sector while reading servo data with a GMR sensor. However, when it is impossible to position a head to a cylinder and bring it into a write enable state within a predetermined time because servo control does not work normally or data cannot be written even by reassigning the address of a write sector to a substitute sector, a write error occurs. Reassignment is executed by the automatic defect re-allocation (ADR) procedure in an ERP. When reassignment is successful, a unit error does not occur. When it is impossible to position a head to a predetermined cylinder within a predetermined time because correct servo data cannot read at the time of seeking, a seek error occurs.

Operation errors include those to be solved by the hardware and those to be solved by software. An ERP automatically recovers an error by software.

When an error occurs under the write, read, or seek operation, a unit detects the error in block 101 and the MPU selects and executes a specific ERP to recover the error (block 103). An ERP comprises a plurality of predetermined execution steps for recovering errors from a slight action up to a high-level action. A read ERP comprises 50 to 100 execution steps, a write ERP comprises 20 to 50 execution steps, and a seek ERP comprises approximately 10 steps. When an error can be recovered by an ERP (block 105), block 107 starts and a unit continues operations. In this case, under the read operation, reassignment may be performed in accordance with the degree in which ERP execution steps are progressed by the time when an error is recovered, that is, the significance of the degree of the error. When the error cannot be recovered even when executing up to the final step in the read ERP or the write ERP fails in reassignment, it is decided that an error occurs. In the case of the unit of this embodiment in which the GMR sensor is used, however, the cause of an error is determined and block 109 is started in order to recover the error because there is a case in which it is considered that the error is caused by a GMR sensor before deciding that the error occurs and notifying a host computer of the error.

A GMR sensor can recover the performance by application of a reset voltage. However, when applying a reset voltage when the error is not caused by the sensor, the sensor is deteriorated. In block 109, confirmation or measurement for deciding whether an error is caused by deterioration of the performance of a GMR sensor and it is effective to recover the performance through GMR resetting is performed in accordance with the contents predetermined for each ERP. FIG. 6 shows evaluation items for deciding the effectiveness of the first GMR resetting for each ERP.

Contact Between Head and Storage Medium

Contact between a head and a storage medium which is the first decision item causes a pulse signal (TA signal) superimposed on a read signal to be generated because a GMR sensor contacts foreign matter present on the storage medium, that is, TA (thermal asperities) and thereby, the temperature of the sensor rises for a moment and electric resistances of the sensor are changed. When the read circuit section 37 detects a TA signal exceeding a threshold, it transmits the information to the HDC 39 and the HDC 39 stores the address of a sector generating the TA signal in the RAM 43. When a read error occurs, the MPU 33 confirms to the HDC 39 whether a TA signal was generated in the past in an address causing an error. When the error was generated, the MPU 33 decides that the sector of the address may almost exactly have a physical defect.

Anti-Regular Write

Anti-regular write which is the second decision item decides whether data is written in a certain sector of a magnetic disk by using a command referred to as WRITE LONG COMMAND. The WRITE LONG command is a command capable of simultaneously determining user data and the contents of an ECC and writing them. In the case of normal operation, the bit pattern of an ECC is automatically determined in accordance with the bit stream of user data and written in a magnetic disk. However, an error may created by executing the WRITE LONG command to evaluate the performance of a unit after shipped and writing user data and an ECC in accordance with a pattern intentionally causing an error and reading the data again. An address written in accordance with the WRITE LONG command is written in the RAM 43 by the MPU 33 and it is confirmed whether an address causing an error coincides with an address in which data is written in accordance with the WRITE LONG command by referring to the RAM 43 when an ERP is executed. When the addresses coincide with each other, it is estimated that an operation error is hardly caused by a GMR sensor. It is possible to store the address of a sector in which data is written in accordance with the WRITE LONG command in the magnetic disk and read the data to a RAM under operation.

Regenerative Signal Margin Check

In the case of regenerative signal margin check which is the third decision item, a margin left for a maximum allowable distance of the waveform of an actual regenerative signal separate from that of a standard regenerative signal is measured by a method referred to as Viterbi margin check. The waveform of read user data and the standard waveform corresponding to the bit pattern of the user data are sampled at the same sampling cycle and the difference between the waveforms at the same sampling time is calculated to calculate the margin. Less margin shows that the reliability of a read signal is lower. In the case of a value equal to or less than the margin, a margin error occurs. The margin of a regenerative signal is continuously measured while user data is read. Unless a margin error occurs when a read error occurs, it is estimated that an operation error is hardly caused by a GMR sensor. Margin check of a regenerative signal is described in Wood, Peterson, "Viterbi Detection of Class IV Partial Response on a Magnetic Recording Channel," IEEE Trans. May 1986, pp. 454–461, Knudson, Wolf and Milstein, "Dynamic Threshold Implementation of the Maximum Likelihood Detector for the ERP4 Channel," IEEE GlobeCom '91 Conf. Record, vol. 3, GlobeCom, Phoenix, Ariz., December 1991, pp. 60B.1.1–60B.1.5.

Margin check as a PR signal is performed by a read/write circuit section after a regenerative signal output from a sensor passes through an automatic gain circuit (AGC) and A-D converter. If a margin error is detected, a signal is transmitted to the MPU. Margin check is generally applied to a sector causing an error. However, to confirm whether a GMR sensor is deteriorated, it is also possible to store a standard bit pattern in an exclusive calibration sector and read the standard bit pattern by the head concerned immediately after an error occurs.

Adjacent Sector Read

Adjacent sector read which is the fourth decision item confirms whether sectors present at adjacent addresses can be read by the same head when a read error occurs. As adjacent addresses, two positions are selected which are separate in the circumferential direction and the radial direction from a sector causing an error. When no error occurs by reading two sectors, an error is hardly caused by a GMR sensor. The cause of the error can be estimated as the presence of a sector in which data is off-track-written or a local error of the storage medium. Because a sector adjacent to a sector causing an error has similar write-bit density and conditions for reading, it is suitable for deciding whether the cause lies in a storage medium. Moreover, when a storage medium is scratched, a magnetic disk is frequently linearly scratched in the radial direction of the disk. Therefore, reading of data at a position deviated from a cylinder or sector is suitable to avoid the above trouble.

Figure 7:
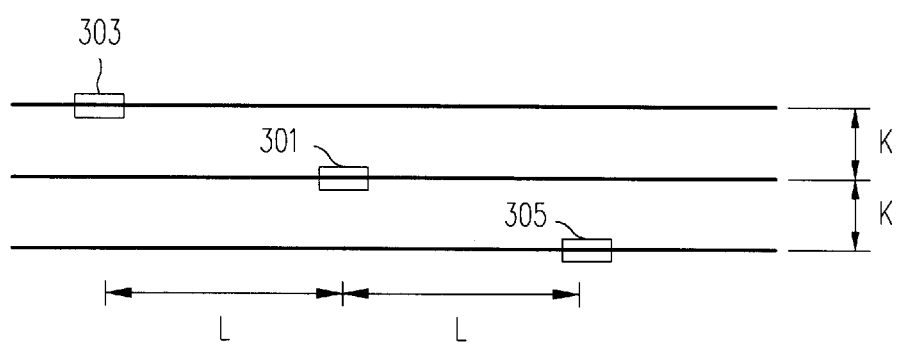
FIG. 7 is a schematic view for explaining the positions of adjacent sectors.

In the case of this embodiment, tracks 303 and 305 adjacent to a sector 301 causing an error are selected as adjacent sectors as shown in FIG. 7. For example, the segregation number of a track is selected as K=1 to 100 and the segregation number of a sector is selected as L=1 to 10. However, the technical idea of the present invention lies in the fact of evaluating whether an error is caused by a GMR sensor by rereading data from a sector whose read and write conditions are similar to those of a sector causing the error as much as possible and avoiding a damage of a medium. However, selection of L and K and the number of adjacent sectors to be accessed are not restricted in the range of the embodiment. The HDC 39 decides whether an error is detected through rereading by using an ECC. If an error is detected, the HDC transmits a signal to the MPU.

Presence of Execution-inhibited ERP Execution Step

Presence of execution-inhibited ERP execution step which is the fifth decision item is used to conform whether a predetermined number of steps of an ERP are executed. Though a unit is set so as to execute every execution step when shipped, a user may change the setting of a unit so that some of steps of an ERP are not executed in order to evaluate the performance of the unit. A lesser number of ERP execution steps may not be able to recover an error which may have been recovered by executing all execution steps and an error due to execution of a lesser number of ERP execution steps may rather damage a head as the result of performing GMR resetting. Moreover, by executing every ERP, an error may be recovered. Therefore, even if a read or write error occurs when a predetermined number of ERP execution steps are not active, it is better not to execute GMR resetting. The information showing which step is active among ERP execution steps is stored in a RAM.

Adjacent Cylinder Seek

Adjacent cylinder seek which is the sixth decision item applies the seek operation to adjacent cylinders again when the read or write operation is interrupted due to a seek error. When seeking can be complete, it is decided that the initial error is caused by a local medium but not caused by deterioration of the performance of a GMR sensor.

Servo Control Check

Servo control check which is the seventh decision item decides the stability of a position error signal (PES), a gray code read error, and locking/unlocking of servo control. The HDC 39 generates a PES from a signal reading the servo data recorded in a magnetic disk as a discrete block to recognize the position of a head in a track. The HDC continuously decides whether the head is positioned in a predetermined range nearby the center of the track in the servo data for a predetermined number of blocks. In this case, because the servo data is continuously and correctly read, it is possible to decide that the performance of a GMR sensor is not deteriorated. The cause of an unstable PES is considered as swing of a spindle or vibration of a unit.

Moreover, the HDC decides whether a gray code of an address causing an error is misread. Misreading of a gray code represents a case in which the address of write data does not coincide with an address specified by a host computer. It is necessary to position a head to a correct track by completing the seek operation before writing data. However, when the S/N ratio of a regenerative signal increases, gray codes showing pieces of positional information for a cylinder and sector may be erroneously read. In this case, unless there is any problem in the servo state of adjacent tracks, the likelihood is low that the cause lies in a GMR sensor. The HDC decides whether the write address specified by a host computer in accordance with a command coincides with an actually read address.

Moreover, the HDC conforms whether servo control is unlocked. Unlocking represents a state in which no gray code can be read at all and the position of servo data is unknown. Also in this case, when adjacent tracks can be sought, the likelihood is low that the cause lies in a GMR sensor.

Regenerative Signal Waveform Error

Regenerative signal waveform error which is the eighth evaluation item measures the difference between the waveform of an actual regenerative signal and the ideal standard waveform for a standard bit pattern previously recorded in a calibration sector provided for a magnetic disk and read by a sensor and compares the both waveforms. This embodiment performs evaluation by using a measure referred to as means square error (MSE) known. However, the idea of the present invention includes a method of generating a regenerative signal from a calibration sector and measuring the difference between the regenerative signal and a standard signal by other measure, for example, a method of examining the amplitude of an AE output signal and measurement of an SER (Soft Error Rate). Moreover, the idea of the present invention includes a case of indirectly measuring the degree of a sensor output value decreased from a standard value in accordance with the amplification factor of an automatic gain circuit (AGC). The value of MSE is measured by a read/write circuit after the regenerative signal passes through an A–D converter. When the value is small, it is decided that the performance of a GMR sensor is preferable.

Bit patterns such as NRZ 00h and FFh are written in the calibration sector at the test stage of manufacture. It is preferable to select a bit pattern for MSE measurement excluding the transient of the minimum magnetization unit (1T) and readable and capable of easily obtaining evaluation data even from a GMR sensor whose performance is deteriorated and moreover, write the bit pattern in an inner cylinder on which a head output appears as a large value. Moreover, it is possible to measure the error of the waveform of a regenerative signal in accordance with the bit pattern of read user data instead of using the standard bit patterns of the calibration sectors. This evaluation item can be applied when a read, write, or seek error occurs.

To evaluate the error of a waveform signal, it is also possible to record the data previously measured at the test stage of manufacture in a magnetic disk and compare the data with a value when an error occurs in addition to a method of using an absolute value as a criterion adopted by this embodiment. The value of the error of the waveform signal is influenced by the temperature and atmospheric pressure of a unit at the time of measurement. Therefore, to compare the value of the error with a value at the time of manufacture, it is preferable to correct a measured value in accordance with the operating temperature and atmospheric pressure of the unit when an error occurs. For correction, it is preferable to use the measured values of other heads in addition to the measured value of the head causing an error.

Coincidence of Error Causing Head With Reassign Destination Head

As the ninth evaluation item, it is decided whether a the head causing reassignment coincides with a reassign destination head. The cause of an error at the time of writing occurs when a GMR sensor cannot read servo data at the time of writing and thereby, it cannot move a head to an accurate position. Causes of a servo data read error include swinging of the spindle and vibration of the unit in addition to the GMR sensor failure. When a write error occurs, an ADR automatically writes data in a moving destination sector and as a result, unless any error occurs, it handles the data by assuming that an error is recovered. Therefore, though GMR resetting is not performed, this decision item is executed when an error also occurs in the moving destination sector. The substitute sector of a reassignment destination if assigned to a predetermined cylinder and the MPU selects the reassignment destination address out of the cylinder. Therefore, there is no guarantee that the reassignment cause head is the same as the reassignment destination head. This is described below by referring to FIG. 2. When a write error occurs on the upper side of the uppermost magnetic disk, a reassignment write destination may be a substitute sector at the lower side of the second magnetic disk. When the reassignment cause head coincides with the reassignment destination head, an operation error is almost exactly caused by deterioration of the performance of a GMR sensor. However, when heads are different from each other, the operation error is almost exactly caused by a factor other than the GMR sensor.

In block 111 after block 109, it is decided whether to perform the fist GMR resetting. When coming under any one of the following items (1) to (10), GMR resetting is not performed independently of the results of other evaluation items.

(1) Physical contact between a head and a storage medium already occurs related to the address causing an error.

(2) Data is intentionally and anti-regularly written in the address causing an error.

(3) There is a sufficient margin of a regenerative signal where an operation error occurs.

(4) Data in the sectors of adjacent addresses can be read by the same head for the address causing an error.

(5) There is a step whose execution is restricted among ERP execution steps.

(6) Seeking tracks adjacent to a target track where an error occurs, can be completed.

(8) The Error Margin of the waveform of a regenerative signal is included in a reference value.

(9) Seeking cannot be completed because a write or seek error is caused by the instability of PES.

(10) An operation error is caused by a gray-code read error and servo control unlocking and adjacent cylinders can be sought.

(11) The cause head and destination head for reassignment generated due to a write error do not coincide with each other.

Results of the above decision items are all collected in the MPU and the MPU decides whether to perform resetting. Application of the above decision items shows an embodiment. It is properly possible to delete some items, combine two items or more, and add other items. Block 115 is started when performing the fist GMR resetting but block 113 is started when GMR resetting is not performed to determine an error. In block 115, the value of MSE measured in block 109 are set to values of INITIAL and PREVIOUS to use the values for decision on the second-time GMR resetting downward.

Then, in block 117, the MPU transmits a reset command to the AE together with a pulse voltage set value and the AE supplies the pulse voltage to a GMR sensor to perform the first GMR resetting. In the case of this embodiment, the first pulse voltage is selected in a range of 0.8 to 1 V. Control of a head when performing GMR resetting is described later as an embodiment of the present invention.

After performing the first GMR resetting, block 119 is started to recover an error by executing an ERP again. In block 119, all ERP execution items can be executed. However, it is preferable to restrict execution items to those related to deterioration of the performance of a GMR sensor and set 5 to 20 steps for a read ERP and write ERP and 2 to 3 steps for a seek ERP. When block 119 is executed and it is confirmed in block 121 that an error is recovered, block 123 is started and a unit continues operations. When the error is not recovered, GMR resetting is repeated a plurality of times and block 125 is started to recover the performance of the sensor. In this case, it is preferable to slowly raise a resetting voltage. However, unless the voltage is limited to an allowable maximum voltage or lower, the sensor can be damaged. In block 125, it is decided whether the resetting voltage applied in block 117 is the maximum allowable voltage which is the final voltage. When the error is not recovered though the maximum allowable voltage is applied, a hard error is determined in block 127 to communicate the hard error to the host computer. In the case of this embodiment, the maximum allowable voltage is set in a range of 1 to 1.5 V. The maximum allowable voltage may be changed in accordance with a temperature sensor set in the unit. Unless the resetting voltage applied in block 117 is equal to the maximum allowable voltage, block 129 is started to make the decision on the second-time GMR resetting downward and execute the setting of a resetting voltage.

Figure 4:
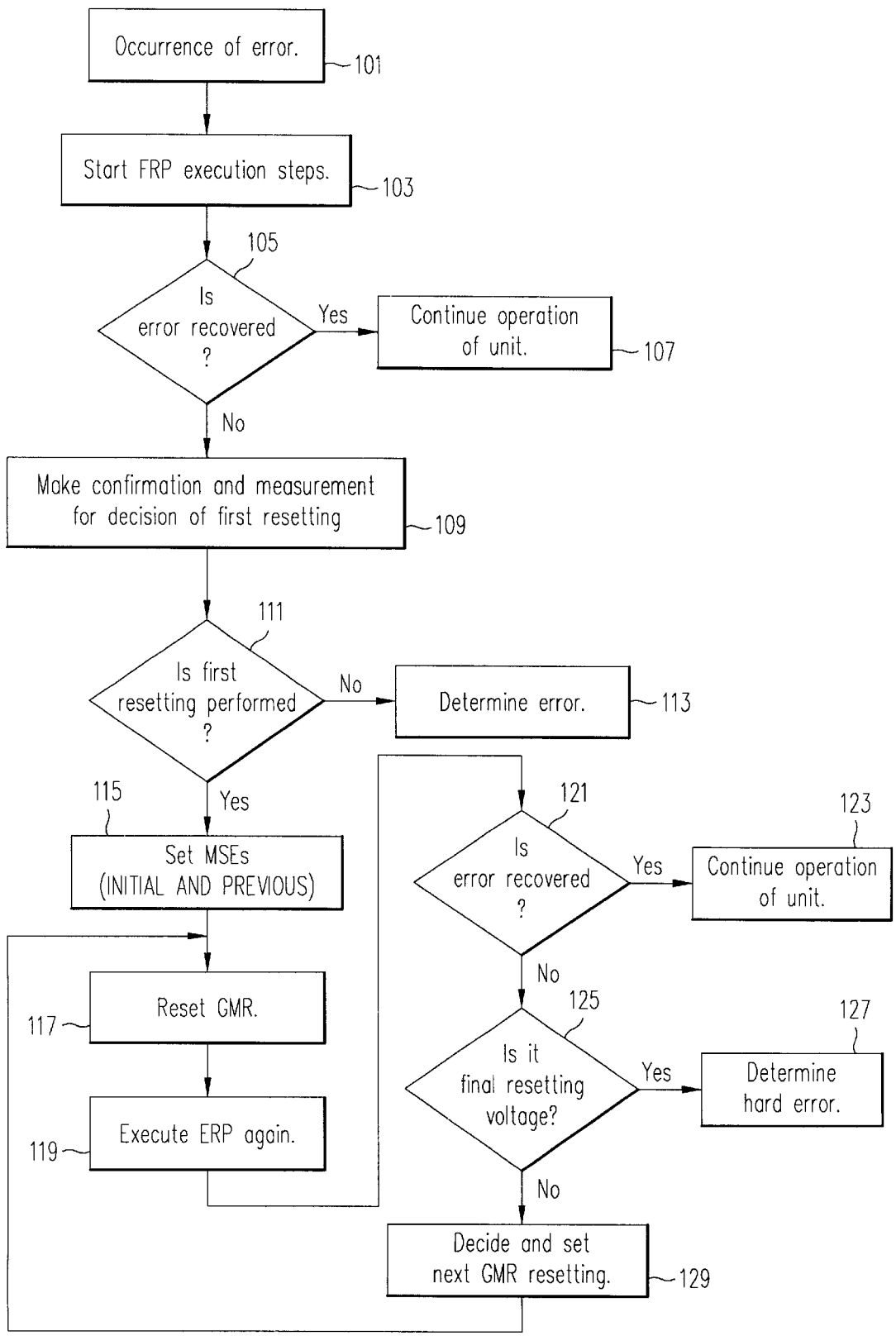
FIG. 4 is a flow chart for explaining an embodiment of the present invention.
Figure 5:
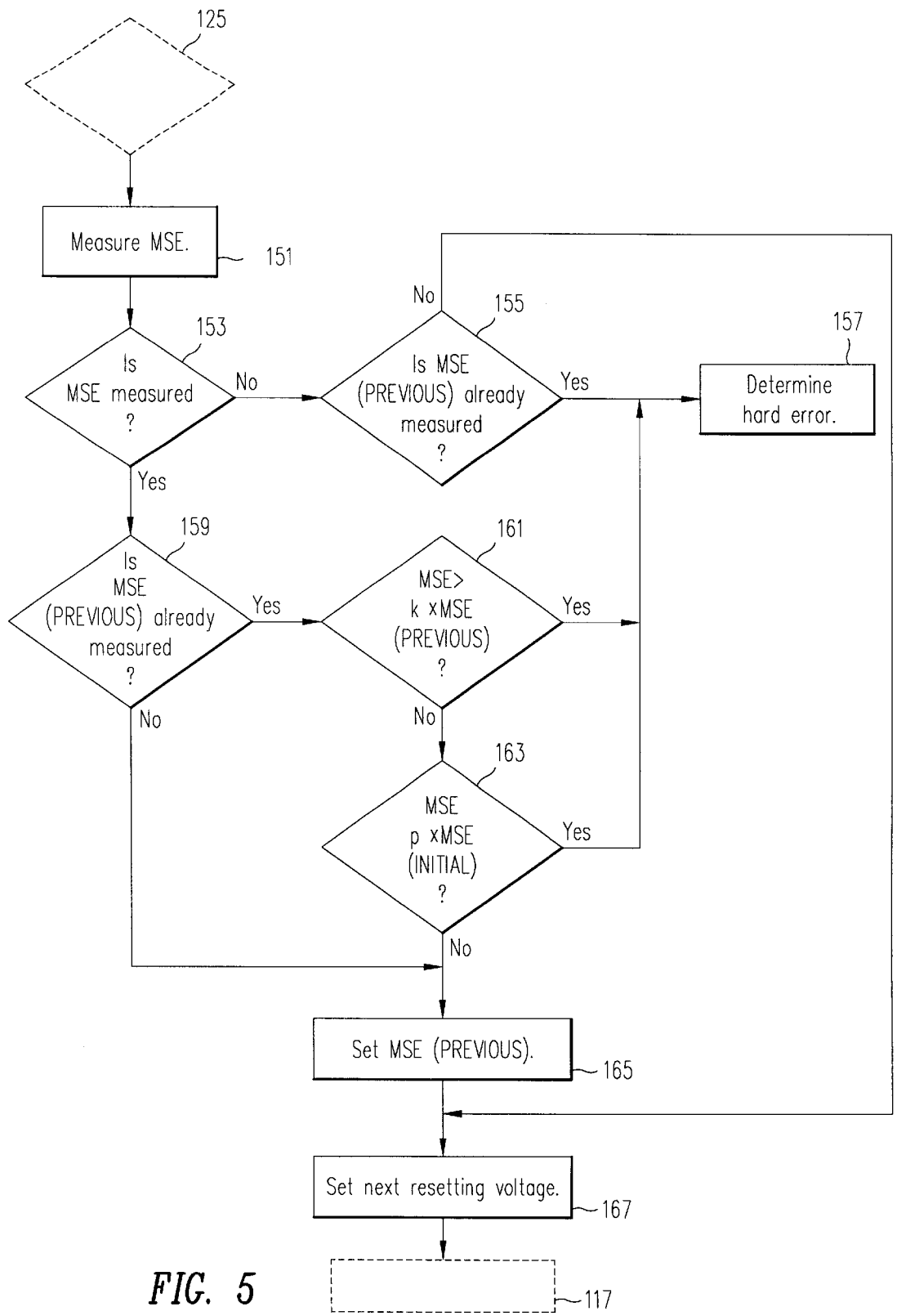
FIG. 5 is a flow chart showing the detail of block 129 in FIG. 4.

FIG. 5 shows the detail of block 129 in FIG. 4. In block 151 in FIG. 5, the present MSE after GMR resetting in block 117 is measured. Measurement of the MSE follows the contents described in block 109 in FIG. 4. In block 153, it is decided whether the MSE can be measured. When the MSE cannot be measured, it is decided in block 155 whether the MSE (PREVIOUS) set in block 115 can be measured. The value of the MSE (PREVIOUS) is rewritten by block 165 to be mentioned later when deciding the third-time GMR resetting downward. When the value of the MSE (PREVIOUS) can be already measured in block 155, it is estimated that the performance of a head is deteriorated due to the last resetting. Therefore, block 157 is started to determine a hard error but resetting is not performed.

When the value of the MSE cannot be measured before and after the last resetting, block 167 is started to set a resetting voltage for the next resetting and moreover, block 117 in FIG. 4 is started to perform the second-time resetting downward. When the value of the present MSE can be measured in block 153, it is decided whether the value of the MSE (PREVIOUS) can be already measured in block 159. When the value of the MSE (PREVIOUS) can be already measured, it is evaluated in block 161 whether the value of the present MSE is k times (k>1) or more larger than that of the MSE (PREVIOUS). When the value of the present MSE is k times or more, it is decided that the performance of the head is deteriorated due to resetting and block 157 is started but the next resetting is not performed. When the value of the present MSE is smaller than k times the MSE (PREVIOUS) in block 161, it is evaluated in block 163 whether the value of the present MSE is p times (p>1) or more larger than that of the MSE (INITIAL) set in block 115. In the case of this embodiment, k and p are respectively set to 1.5. When the value of the present MSE is p times or more larger than that of the MSE (INITIAL), it is decided that the performance of the head is deteriorated due to resetting and block 157 is started but the next resetting is not performed.

When the value of the MSE (PREVIOUS) is not measured in block 159, it is estimated that the performance of a sensor tends to recover by resetting because the value of the present MSE can be measured though an error is not recovered. Therefore, block 165 is started so that the error can be recovered by further performing resetting. When the value of the present MSE is smaller than the p-time value of the MSE (INITIAL) in block 165, it is decided that the performance of the head does not tend to deteriorate due to resetting and block 165 is started. In block 165, the value of the MSE (PREVIOUS) is set to the value of the present MSE measured in block 151. Then, the next resetting voltage is set in block 167 to start block 117 to perform the next resetting. In the case of this embodiment, the first resetting voltage n1 is selected in a range of 1 to 0.8 V and the maximum allowable voltage n6 is selected in a range of 1 to 1.5 V. Moreover, it is possible to properly select resetting voltages n2 to n5 between the first resetting voltage and the maximum allowable voltage is as to be n1<n2<n3<n4<n5<n6.

To apply a resetting voltage in the case of this embodiment, two cases are included in which the present MSE can be measured and it cannot be measured. When the MSE cannot be measured, it is impossible to know whether the performance of a head is improved through resetting. Therefore, when the performance of the head is rather deteriorated due to resetting, the head may be damaged by applying a high resetting voltage in block 167. However, when the MSE can be measured, it is possible to set the maximum resetting voltage to a large value compared to the case in which the MSE cannot be measured. When the MSE can be measured, it is possible to apply a pulse voltage of up to a value before a pulse voltage at which a sensor is damaged and repeat resetting several times by slowly raising a resetting voltage while confirming the change of performances of a head and thereby, increase the number of opportunities for recovery of deterioration without damaging the sensor.

When an error cannot be recovered by a conventional ERP while a unit operates in blocks 101 to 105 in FIG. 4, block 109 for deciding the first GMR resetting is started. However, it is also possible to execute a POR (Power On Reset) program when the power supply of the unit is turned on to confirm the performances of a head and a cylinder and start block 109 when an error occurs.

The above described GMR resetting decision is performed after an error occurs and the error cannot be recovered even by executing an ERP, thus resulting in a state immediately before determining that a hard error occurs. Then, a method of performing resetting when the number of reassignments counted for each head reaches a predetermined value is described below as an embodiment of other resetting decision method. When a lot of ERP execution steps are required to read data under the read operation, the contents in a user sector in which read data is stored may be reassigned to the address destination of a substitute sector while an ERP is executed. Moreover, when data cannot be written in the address of a sector specified under the write operation, writing of data in a substitute sector may be reassigned while an ERP is executed. In any case, an error is recovered when reassignment is successful but a hard error does not occur. There are various causes in which reassignment occurs. Deterioration of the performance of a GMR sensor is included as one of the causes in which a number of reassignments increases. Moreover, the number of substitute sectors is limited and it is not preferable that the number of reassignments increases because extra time for seeking is required to access the substitute sectors.

Figure 8:
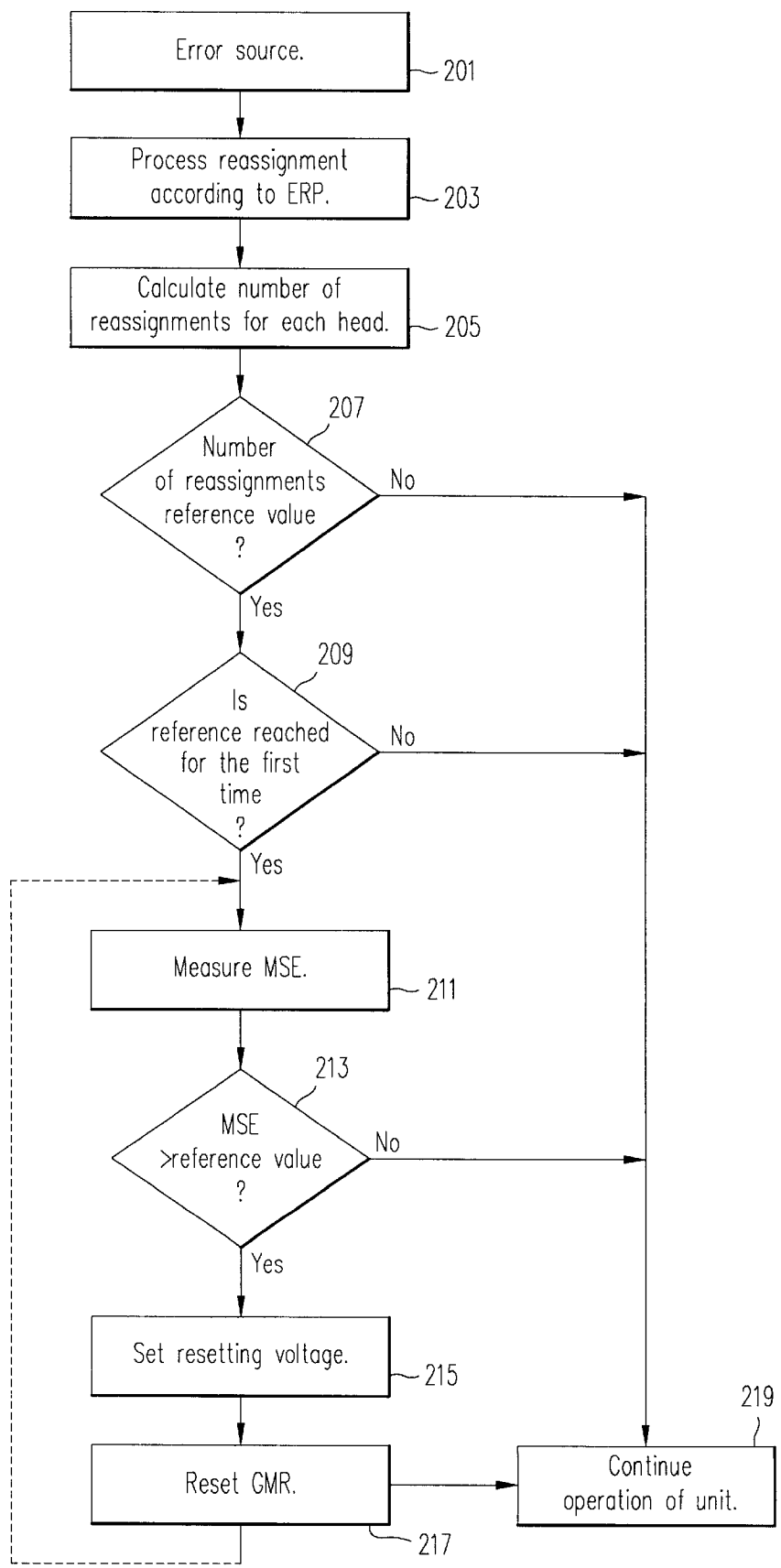
FIG. 8 is a flow chart for explaining an embodiment of the present invention.

FIG. 8 shows a flow chart for explaining an embodiment for performing GMR resetting when the number of reassignments becomes a predetermined value or more. When a write error occurs in a unit or a lot of ERP execution steps are required for reading in block 201, the write error is recovered and reassignment is performed to read the same address in future in block 203. Then, in block 205, a reassignment source address and a reassignment destination address are stored in a RAM when reassignment is performed and moreover, stored in a magnetic disk. Furthermore, the number of reassignments is counted for each head causing reassignment. Then, in block 207, the number of reassignments for each head is compared with a reference value.

In the case of this embodiment, the reference value is set to 200 times. When the number of reassignments is equal to the reference value or less in block 207, block 219 is started and the unit continues operations. When the number of reassignments exceeds the reference value for any head, it is decided in block 209 whether the number of reassignments of the head concerned reaches the reference value for the first time. When the fact of reaching the reference value is not the first time, block 219 is started without performing GMR resetting. When the fact of reaching the reference value is the first time, block 211 is started to measure an MSE. The MSE is measured by reading the standard bit pattern of a calibration sector as described for block 109 in FIG. 4. Moreover, it is possible to measure SER and the amplification factors of AGC instead of the MSE. Then, in block 213, the value of the MSE is compared with a reference value. When the value of the MSE is smaller than the reference value, it is decided that reassign is caused by a factor other than a GMR sensor and block 219 is started. When the value of the MSE cannot be measured or it is equal to or larger than the reference value, it is decided that the sensor is deteriorated, a resetting voltage is set in block 215, and GMR resetting is performed in block 217.

Moreover, block 217 is completed and block 211 is started, an MSE is measured after GMR resetting, and it is possible to repeat GMR resetting while raising the resetting voltage until the value of the MSE reaches the reference value. In this case, when the value of the MSE shows the trend of deterioration of the performance of the sensor due to resetting, it is preferable to stop resetting.

In the case of this embodiment, only one reference value is set. However, it is possible to set a plurality of reference values in accordance with the number of times of resetting of each head in order to execute a plurality of times of GMR resetting due to reassignment. For example, by setting three reference values of 200, 400, and 600 times, it is decided whether the total number of reassignments reaches 200 times in the case of the first GMR resetting for a certain head and it is decided whether the total number of reassignments reaches 400 and 600 times in the case of the second- and third-time GMR resetting. To execute the resetting according to the number of reassignments a plurality of times, it is preferable to set the maximum number of times of resetting and execute resetting within the maximum number of times.

Then, continued from block 217 in FIG. 8, an embodiment for securing the space of a substitute sector by canceling an executed reassignment is described below in accordance with the flow chart in FIG. 9. In block 301, it is decided whether a reassignment destination substitute space has enough margin. When the substitute space has margin, reassignment is not canceled. When the space does not have any margin, subsequent errors cannot be recovered by reassign and therefore, block 303 is started. In block 303, reading and writing are checked in order to confirm whether a reassignment source data sector can be used. When reassignment can be recovered, that is, when data can be easily written in or read from a sector causing reassignment without executing an ERP, reassignment is canceled in block 307, the data stored in a substitute sector is rewritten in an original user sector, and block 309 is started to continue the operation of the unit.

To decide the necessity for other GMR resetting, there is a method of counting the number of times of dummy write for each head and resetting a faulty GMR sensor when the number of times of dummy write reaches a predetermined value. In general, in the case of a seek ERP, an error is recovered by applying dummy write to other spare address in order to eliminate the instability of the write operation caused by deterioration of the performance of a GMR sensor. Therefore, even if dummy write is successful and the error can be recovered, the number of times of dummy write for each head shows the trend of deterioration of the head concerned.

Then, to perform GMR resetting, a method of excluding the influence of an external magnetic field on a head and performing GMR resetting quickly and securely. To reset a GMR sensor, a fixed-layer magnetizing direction is constructed again by applying a resetting voltage to the GMR sensor, raising the temperature to the blocking temperature or higher by a pulse current, and cooling the fixed layer while keeping the magnetic field of the fixed layer in a predetermined direction by the pulse current. If a magnetic field of a storage medium works on the GMR sensor while raising the temperature of the GMR sensor to the blocking temperature or higher by applying the resetting voltage to the sensor, the magnetizing direction of the fixed layer may be deviated from an expected direction and as a result, the magnetizing direction of a pinning layer may be also changed from an expected value. Servo data and user data are recorded on a magnetic disk and magnetic flux is emitted to the surface of the magnetic disk in accordance with the magnetizing direction of each bit. Therefore, when applying the resetting voltage, it is necessary to set a head to a position which is not influenced by the magnetic flux emitted from the magnetic disk.

Figure 10:
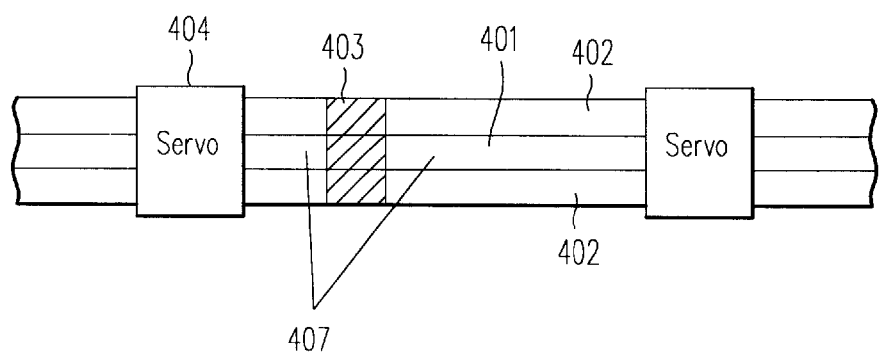
FIG. 10 is a schematic view for explaining a DC-erased area.

As shown in FIG. 10, the first method is a method of providing a DC-erased resetting area to a part 403 of the sector of a specific track 401 and applying a resetting voltage when a head is positioned to the resetting area. The resetting area is an area turned in the direction in which a magnetic domain does not emit a magnetic field to the outside, which is previously formed on a part of a magnetic disk. A head requiring GMR resetting cannot read data or its performance is deteriorated. Therefore, the servo data for positioning a head to a track 403 is read by another head. When it is decided that a head to be reset reaches a resetting area in accordance with the seek operation and search operation by a head currently reading servo data, an active head is changed to the head to be reset to apply a resetting voltage. In this case, it is assumed that there is a slight error in a position in the planar direction between the head to be reset and the servo data read head. Therefore, it is preferable to set a track 402 provided with a DC-erased area to the same position at the both sides of the track 401. Moreover, it is preferable to apply the resetting voltage at a position which is adequately separate from a data area 407 and is not influenced by a magnetic field after a head reaches the address in a resetting area and then moves in the circumferential direction.

The second method applies a resetting voltage by driving an actuator arm by a VCM so as to position a head to the outermost or innermost cylinder. In general, data is not written in the outermost or innermost cylinder. Therefore, by DC-erasing one of these cylinders, it is possible to exclude the influence of the magnetic field of a magnetic disk at the time of resetting. The head can be positioned to the outermost or innermost cylinder by supplying the large current to the VCM while servo control is stopped. In the case of this method, it is unnecessary to perform the seek operation or search operation by changing heads and it is possible to drive a VCM while servo control is not performed.

The third method is a method of applying a resetting voltage at unload position in case of a load/unload system. Also when a magnetic disk stops, a head is engaged with a ramp set to a position separate from the surface of the magnetic disk. In case of CSS system, resetting after stopping spindle is possible. Head is positioned at non-recording textured area.

After a resetting voltage is applied, by recording a head number, a pulse voltage, the number of times of application, and an MSE, it is possible to use the data for the decision on GMR resetting when an operation error occurs later.

It is possible to store the programs for executing the error recovery methods described above as embodiments in a magnetic disk or ROM and make an MPU execute the programs whenever an error occurs by reading them to a RAM when starting a unit.

The present invention makes it possible to improve the performance of an information recording and reproducing unit using a GMR sensor.

Moreover, the present invention makes it possible to improve the effectiveness of GMR resetting without accelerating the deterioration of a sensor due to careless GMR resetting and quickly recover an error by deciding whether the error is caused by GMR sensor before starting GMR resetting in order to recover the error through GMR resetting.

Furthermore, the present invention makes it possible to improve the certainty of the second-time resetting onward and prevent a GMR sensor from damaging by deciding whether the last resetting deteriorates the performance of the sensor in accordance with the performance of a head before the first resetting and the performance of the head after resetting executed before the scheduled resetting concerned when performing the second-time GMR resetting downward to determine whether to perform the scheduled resetting concerned.

Furthermore, the present invention makes it possible to early eliminate a state in which the access time of a unit increases because deterioration of a GMR sensor advances and thereby, the number of reassignments increases by counting the number of reassignments of a sector caused by a read or write error for each head and moreover, prevent every substituted sector from being used. Furthermore, it is possible to prevent the processing time of a unit from decreasing due to dummy write and early recover the performance of a sensor by deciding the deterioration of a GMR sensor in accordance with the counted number of dummy write for each head and thereby performing resetting.

Furthermore, the present invention makes it possible to exclude the influence of the magnetic field generated by a storage medium in a unit and perform GMR resetting quickly and securely.

Furthermore, the present invention makes it possible to provide an information recording and reproducing unit superior in recovery of an error related to deterioration of the performance of a GMR sensor.

We claim:

1. A method for recovering from an operation error arising in an information recording and reproducing unit including a storage medium, a head with a GMR sensor, an actuator arm mounting said head to position said head to a predetermined position on the surface of said storage medium, and a control section for controlling the operation of said actuator arm and read and write operations, the method comprising the steps of:

executing a first error recovery procedure for recovering said operation error;

executing a first GMR evaluation procedure for evaluating the performance of said GMR sensor when said operation error cannot be recovered by said first error recovery procedure:

applying a reset pulse to said GMR sensor in accordance with said first GMR evaluation procedure;

executing a second error recovery procedure for recovering said operation error;

executing a second GMR evaluation procedure for evaluating the performance of same GMR sensor when said operation error cannot be recovered by said second error recovery procedure; and applying a rest pulse to said GMR sensor in accordance with said second GMR evaluation procedure.

2. The method according to claim 1, wherein said second GMR evaluation procedure includes the Error Margin measurement of a waveform of a regenerative signal generated by reading a bit pattern from said storage medium by said head.

3. The method according to claim 2, wherein said bit pattern is a standard test bit pattern previously stored in a calibration sector of said storage medium.

4. A method for recovering from an operation error arising in an information recording and reproducing unit including a storage medium, a head with a GMR sensor, an actuator arm mounting said head to position said head to a predetermined position on the surface of said storage medium, and a control section for controlling the operation of said actuator arm and read and write operations, the method comprising the steps of:

executing a first error recovery procedure for recovering said operation error;

executing a first GMR evaluation procedure for evaluating the performance of said GMR sensor when said operation error cannot be recovered by said first error recovery procedure; and applying a reset pulse to said GMR sensor in accordance with said first GMR evaluation procedure;

wherein the step of applying a reset pulse in accordance with said first GMR evaluation procedure includes, the step of applying a reset pulse after positioning said head to a position not influenced by magnetic flux generated by said storage medium.

5. A method for recovering from an operation error arising in an information recording and reproducing unit including a storage medium, a head with a GMR sensor, an actuator arm mounting said head to position said head to a predetermined position on the surface of said storage medium, and a control section for controlling the operation of said actuator arm and read and write operations, the method comprising the steps of:

executing a first error recovery procedure for recovering said operation error;

executing a first GMR evaluation procedure for evaluating the performance of said GMR sensor when said operation error cannot be recovered by said first error recovery procedure; and applying a reset pulse to said GMR sensor in accordance with said first GMR evaluation procedure;

wherein the step of applying said reset pulse in accordance with said first GMR evaluation procedure includes, the step of providing a DC-erased area for a part of said storage medium and applying said reset pulse after positioning said head to said DC-erased position.

6. The method according to claim 5, wherein the step of positioning said head to said DC-erased position includes the step of reading servo data by a head other than the head for applying a reset pulse.

7. A method for recovering an operation error arising in an information recording and reproducing unit including a storage medium, a head using a GMR sensor, an actuator arm mounting said head to position said head to a predetermined position on the surface of said storage medium, and a control section for controlling the operation of said actuator arm and read and write operations, the method comprising the steps of:

executing a first error recovery procedure for recovering said operation error;

executing a first GMR evaluation procedure for evaluating the performance of said GMR sensor when said operation error cannot be recovered by said first error recovery procedure;

applying a reset pulse to said GMR sensor in accordance with said first GMR evaluation procedure;

executing a second error recovery procedure for recovering said operation error;

executing a second GMR evaluation procedure for evaluating the performance of said GMR sensor when said operation error cannot be recovered by said second error recovery procedure;

applying a reset pulse to said GMR sensor in accordance with said second GMR evaluation procedure; and repeating the step of executing said second error recovery procedure, the step of executing said second GMR evaluation procedure, and the step of applying a reset pulse to said GMR sensor in accordance with said second error recovery procedure.

8. The method according to claim 7, wherein the step of applying a reset pulse to said GMR sensor in accordance with said second GMR evaluation procedure includes:

the step of selecting an amplitude of a reset pulse so as to gradually raise the amplitude as the reset pulse.

9. The method according to claim 8, further comprising the step of:

setting the upper limit of the amplitude of said reset pulse in accordance with said second GMR evaluation procedure.

10. The method according to claim 7, wherein said second GMR evaluation procedure includes an Error Margin measurement of a waveform of a regenerative signal generated by reading a bit pattern from said storage medium.

11. The method according to claim 7, wherein said step of applying a reset pulse to said GMR sensor in accordance with said second error recovery procedure includes the step of stopping application of a reset pulse when an Error Margin of the waveform of a regenerative signal after applying a last reset pulse is worse than the Error Margin of the waveform of a regenerative signal after applying a reset pulse before the last reset pulse in the evaluation made in said second GMR evaluation process.

12. A method for recovering an operation error arising in an information recording and reproducing unit including a storage medium, a head using a GMR sensor, an actuator arm mounting said head to position said head to a predetermined position on the surface of said storage medium, and a control section for controlling the operation of said actuator arm and read and write operations, the method comprising the steps of:

executing an error recovery procedure for recovering said operation error;

counting the number of reassignments executed in accordance with said error recovery procedure for each head;

evaluating the counted number of reassignments for each head; and applying a reset pulse to said GMR sensor in accordance with the evaluation of said number of reassignments for each head.

13. The method according to claim 12, further comprising the steps of:
- measuring an Error Margin of a waveform of a regenerative signal generated by reading a bit pattern stored in said storage medium; and
- evaluating the Error Margin of the waveform of said generated regenerative signal.

14. The method according to claim 13, further comprising the steps of:
- confirming whether a substitute spare sector for reassignment of said storage medium has room;
- conforming whether past executed reassignment can be recovered; and
- canceling said executed reassignment in accordance with the result of said step for confirmation and enlarging the space of said substitute sector.

15. A method for recovering an operation error arising in an information recording and reproducing unit including a storage medium, a head using a GMR sensor, an actuator arm mounting said head to position said head to a predetermined position on the surface of said storage medium, and a control section for controlling the operation of said actuator arm and read and write operations, the method comprising the steps of:
- executing an error recovery procedure for recovering said operation error;
- counting the number of times of dummy write executed in accordance with said error recovery procedure for each head;
- evaluating said counted number of times of dummy write for each head; and
- applying a reset pulse to said GMR sensor in accordance with the evaluation of said number of times of dummy write for each head.

* * * * *